(12) United States Patent
Saga (10) Patent No.: US 8,272,007 B2
(45) Date of Patent: Sep. 18, 2012

(54) BROADCAST RECEIVING APPARATUS RECEIVING BROADCAST SIGNAL AND METHOD OF CONTROLLING THE APPARATUS

(75) Inventor: Yoshihiro Saga, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 12/537,915

(22) Filed: Aug. 7, 2009

(65) Prior Publication Data

US 2010/0180290 A1    Jul. 15, 2010

(30) Foreign Application Priority Data

Aug. 11, 2008    (JP) .................................. 2008-207403

(51) Int. Cl.
*H04N 7/167* (2011.01)
(52) U.S. Cl. ........... 725/31; 386/252; 386/255; 380/200
(58) Field of Classification Search .................. None
See application file for complete search history.

(56) References Cited

U.S. PATENT DOCUMENTS

| | | | | |
|---|---|---|---|---|
| 6,237,786 | B1 * | 5/2001 | Ginter et al. | 213/153 |
| 6,373,904 | B1 * | 4/2002 | Sakamoto et al. | 375/316 |
| 6,971,008 | B2 * | 11/2005 | Wasilewski et al. | 713/168 |
| 7,401,232 | B2 * | 7/2008 | Ono et al. | 713/193 |
| 7,609,836 | B2 * | 10/2009 | Vince | 380/239 |
| 8,050,406 | B2 * | 11/2011 | Pedlow, Jr. | 380/277 |
| 2004/0244032 | A1 * | 12/2004 | Yamada | 725/25 |
| 2005/0226417 | A1 * | 10/2005 | Kubota et al. | 380/228 |
| 2006/0274898 | A1 * | 12/2006 | Pedlow, Jr. | 380/277 |
| 2010/0119060 | A1 * | 5/2010 | Nishida et al. | 380/43 |
| 2010/0180290 | A1 * | 7/2010 | Saga | 725/31 |

FOREIGN PATENT DOCUMENTS

| | | | | |
|---|---|---|---|---|
| JP | 10191302 | A | * | 7/1998 |
| JP | 2000-115091 | A | | 4/2000 |
| JP | 2007-129575 | A | | 5/2007 |

* cited by examiner

*Primary Examiner* — Brian Pendleton
*Assistant Examiner* — Fernando Alcon
(74) *Attorney, Agent, or Firm* — Canon USA Inc. IP Division (57) ABSTRACT

A broadcast receiving apparatus includes a generating unit generating a first encryption key specific to the broadcast receiving apparatus including identification information; a recording unit recording a broadcast stream that is included in a certain channel of broadcast signals and that includes an individual information stream and a content stream requiring a second encryption key for decryption, the individual information stream periodically including first individual information items and second individual information items; a searching unit searching for the earliest first individual information item and the earliest second individual information item from the individual information stream included in the broadcast stream; and an overwriting unit overwriting the found second individual information item at a position that is earlier than the position of the found second individual information item and that is later than the position of the found first individual information item in the individual information stream.

12 Claims, 9 Drawing Sheets

BROADCAST RECEIVING APPARATUS RECEIVING BROADCAST SIGNAL AND METHOD OF CONTROLLING THE APPARATUS

BACKGROUND OF THE INVENTION

1. Field of the Invention

The present invention relates to a broadcast receiving apparatus receiving broadcast signals and to a method of controlling the broadcast receiving apparatus.

2. Description of the Related Art

Content that is scrambled is transmitted in terrestrial digital broadcasting. Content is scrambled by using a Conditional Access System (CAS). B-CAS systems using integrated circuit (IC) cards are employed as the CAS systems at present.

A method for protecting content (particularly, the copyright of content) in broadcast receiving apparatuses is called Rights Management and Protection (RMP). Encryption keys are used to encrypt content in the RMP method. In the current B-CAS systems, for example, three types of encryption keys including a scramble key, a work key, and a master key are hierarchically used (refer to Association of Radio Industries and Businesses (ARIB) Standard (STD) B-25 Version 5.1 in Japan).

In addition, a new content protection method (hereinafter referred to as a "new RMP method") is standardized in "Daisan-bu: Jushin-ji no Seigyo Houshiki (Kontentsu Hogo Houshiki) (Section 3: Control method upon reception (Content protection method)" in ARIB STD B-25 Version 5.1 in Japan. Three types of encryption keys including a scramble key, a work key, and a device key are hierarchically used in the new RMP method.

In the new RMP method, an Entitlement Management Message (EMM) for setting the work key and an Entitlement Control Message (ECM) for transmitting the scramble key are transmitted from each broadcast station operating the new RMP method to one broadcast receiving apparatus on a certain cycle.

The EMM is data carrying information specific to each broadcast receiving apparatus and includes identification information (device ID) used for identifying each broadcast receiving apparatus and a work key for decrypting the ECM. An EMM for updating the device key is also transmitted in the new RMP method, and each EMM of this type also include a device ID. The EMM for setting the work key is hereinafter called a work-key setting EMM and the EMM for updating the device key is hereinafter called a device-key updating EMM.

The ECM is data carrying information common to all the broadcast receiving apparatuses and includes a scramble key for decrypting content and information about programs.

The ECM is encrypted with the work key for every RMP business unit whereas the EMM is encrypted with the device key for every device ID. Each broadcast receiving apparatus receives the EMMs that are periodically transmitted and that should be acquired by the own broadcast receiving apparatus to set the work key and so on. While content is watched by a viewer, the broadcast receiving apparatus of the viewer receives the ECM and processes the received ECM to acquire the scramble key and descramble the content by using the scramble key.

The work-key setting EMMs of types corresponding to the types (numbers) of the device IDs are provided and the device-key updating EMMs of types corresponding to the types of the device IDs are provided in the new RMP method. Accordingly, from the viewpoint of a certain broadcast receiving apparatus, the EMMs that are received include a work-key setting EMM for the own apparatus (an own-apparatus work-key setting EMM), a device-key updating EMM for the own apparatus (an own-apparatus device-key updating EMM), and EMMs for multiple other apparatuses.

Broadcasting of new types, such as IP broadcasting, is increasingly used in recent years and the number of broadcasting business companies will be increased along with the increase of the new types of broadcasting. Since different work keys are used for different broadcasting business companies in each CAS system, the number of types of the work key will be increased in the future.

A case will now be considered in which a broadcast receiving apparatus directly records a broadcast stream including, for example, content and the EMMs on a recording medium and then plays back the content. If the work key set for the CAS system does not correspond to the content when the broadcast receiving apparatus plays back the content, it is necessary for the broadcast receiving apparatus to acquire the work key corresponding to the content and to set the acquired work key in the CAS system.

In order for the broadcast receiving apparatus to acquire the work key, it is necessary for the broadcast receiving apparatus to read out the broadcast stream and to acquire the EMMs corresponding to the own apparatus from among the EMMs that are sequentially read out. Since the EMMs corresponding to the own apparatus are periodically transmitted, as described above, it takes a time (a few seconds to several tens of seconds) corresponding to up to one period to acquire the EMMs. The time necessary for acquiring the EMMs depends on the number of device IDs. Since the broadcast receiving apparatus cannot play back the content during the acquisition of the EMMs, the screen of the display device is blacked out. The broadcast receiving apparatus may be configured so that the broadcast receiving apparatus reads out a broadcast stream before the playback of the content is started to acquire the EMMs corresponding to the own apparatus. However, in this case, it is necessary for a user to wait a time corresponding to up to one period before the playback of the content is started.

Although a technology for acquiring a scramble key to reduce the time necessary for channel switching is disclosed in a Japanese Patent Laid-Open No. 2007-129575, it is difficult to resolve the above issues with this technology.

SUMMARY OF THE INVENTION

The present invention provides a technology for reducing the time before a broadcast receiving apparatus starts to play back content that is recorded.

According to an embodiment of the present invention, a broadcast receiving apparatus that includes identification information used for identifying the broadcast receiving apparatus and that receives broadcast signals includes a generating unit configured to generate a first encryption key specific to the broadcast receiving apparatus including the identification information; a recording unit configured to record a broadcast stream that is included in a certain channel of the broadcast signals and that includes an individual information stream and a content stream requiring a second encryption key for decryption, the individual information stream periodically including first individual information items that are necessary for the generation of the first encryption key by the generating unit and second individual information items that each include the second encryption key and that can be decrypted with the first encryption key; a searching unit configured to search for the earliest first individual information item in the individual information stream and the earliest second individual information item in the individual information stream from the individual information stream included in the broadcast stream recorded in the recording unit; and an overwriting unit configured to overwrite the second individual information item found by the searching unit at a position that is earlier than the position where the second individual information item is found and that is later than the position where the first individual information item is found in the individual information stream.

According to another embodiment of the present invention, a broadcast receiving apparatus that includes identification information used for identifying the broadcast receiving apparatus and that receives broadcast signals includes a generating unit configured to generate a first encryption key specific to the broadcast receiving apparatus including the identification information; a recording unit configured to record a broadcast stream that is included in a certain channel of the broadcast signals and that includes an individual information stream and a content stream requiring a second encryption key for decryption, the individual information stream periodically including first individual information that is necessary for the generation of the first encryption key by the generating unit and second individual information that includes the second encryption key and that can be decrypted with the first encryption key; a searching unit configured to search for the first individual information and the second individual information from the individual information stream included in the broadcast stream recorded in the recording unit; and an overwriting unit configured to alternately overwrite the first individual information and the second individual information that are found by the searching unit over the individual information stream.

According to another embodiment of the present invention, a broadcast receiving apparatus that includes identification information used for identifying the broadcast receiving apparatus and that receives broadcast signals includes a generating unit configured to generate a first encryption key specific to the broadcast receiving apparatus including the identification information; a recording unit configured to record a broadcast stream that is included in a certain channel of the broadcast signals and that includes an individual information stream and a content stream requiring a second encryption key for decryption, the individual information stream periodically including first individual information that is necessary for the generation of the first encryption key by the generating unit and second individual information that includes the second encryption key and that can be decrypted with the first encryption key; a searching unit configured to search for the first individual information and the second individual information from the individual information stream included in the broadcast stream recorded in the recording unit; and a storing unit configured to store information indicating the positions of the first individual information and the second individual information that are found by the searching unit in a header of the broadcast stream.

According to another embodiment of the present invention, a method of controlling a broadcast receiving apparatus that includes identification information used for identifying the broadcast receiving apparatus and that receives broadcast signals includes generating a first encryption key specific to the broadcast receiving apparatus including the identification information; recording a broadcast stream that is included in a certain channel of the broadcast signals and that includes an individual information stream and a content stream requiring a second encryption key for decryption, the individual information stream periodically including first individual information that is necessary for the generation of the first encryption key in the generating step and second individual information items that each include the second encryption key and that can be decrypted with the first encryption key; searching for the earliest first individual information item in the individual information stream and the earliest second individual information item in the individual information stream from the individual information stream included in the broadcast stream recorded in the recording step; and overwriting the second individual information item found in the searching step at a position that is earlier than the position where the second individual information item is found and that is later than the position where the first individual information item is found in the individual information stream.

According to another embodiment of the present invention, a method of controlling a broadcast receiving apparatus that includes identification information used for identifying the broadcast receiving apparatus and that receives broadcast signals includes generating a first encryption key specific to the broadcast receiving apparatus including the identification information; recording a broadcast stream that is included in a certain channel of the broadcast signals and that includes an individual information stream and a content stream requiring a second encryption key for decryption, the individual information stream periodically including first individual information that is necessary for the generation of the first encryption key in the generating step and second individual information that includes the second encryption key and that can be decrypted with the first encryption key; searching for the first individual information and the second individual information from the individual information stream included in the broadcast stream recorded in the recording step; and alternately overwriting the first individual information and the second individual information that are found in the searching step over the individual information stream.

According to another embodiment of the present invention, a method of controlling a broadcast receiving apparatus that includes identification information used for identifying the broadcast receiving apparatus and that receives broadcast signals includes generating a first encryption key specific to the broadcast receiving apparatus including the identification information; recording a broadcast stream that is included in a certain channel of the broadcast signals and that includes an individual information stream and a content stream requiring a second encryption key for decryption, the individual information stream periodically including first individual information that is necessary for the generation of the first encryption key in the generating step and second individual information that includes the second encryption key and that can be decrypted with the first encryption key; searching for the first individual information and the second individual information from the individual information stream included in the broadcast stream recorded in the recording step; and storing information indicating the positions of the first individual information and the second individual information that are found in the searching step in a header of the broadcast stream.

With the above configurations, it is possible to reduce the time before a broadcast receiving apparatus starts to play back content that is recorded.

Further features of the present invention will become apparent from the following description of exemplary embodiments with reference to the attached drawings.

DESCRIPTION OF THE EMBODIMENTS

Embodiments of the present invention will herein be described with reference to the attached drawings. The embodiments of the present invention described below will help understanding of various concepts of the present invention from upper-level concepts to lower-level concepts.

The technical scope of the present invention is defined by the claims and is not restricted by the respective embodiments of the present invention. All the combinations described in the embodiments are not essential to the present invention.

For convenience, streams included in a given channel of broadcast signals are called broadcast streams in the embodiments described below. The broadcast streams each include a content stream and an individual information stream. The individual information stream (also called an EMM stream) means a data stream periodically including an own-apparatus device-key updating EMM (first individual information) and an own-apparatus work-key setting EMM (second individual information).

Figure 1:
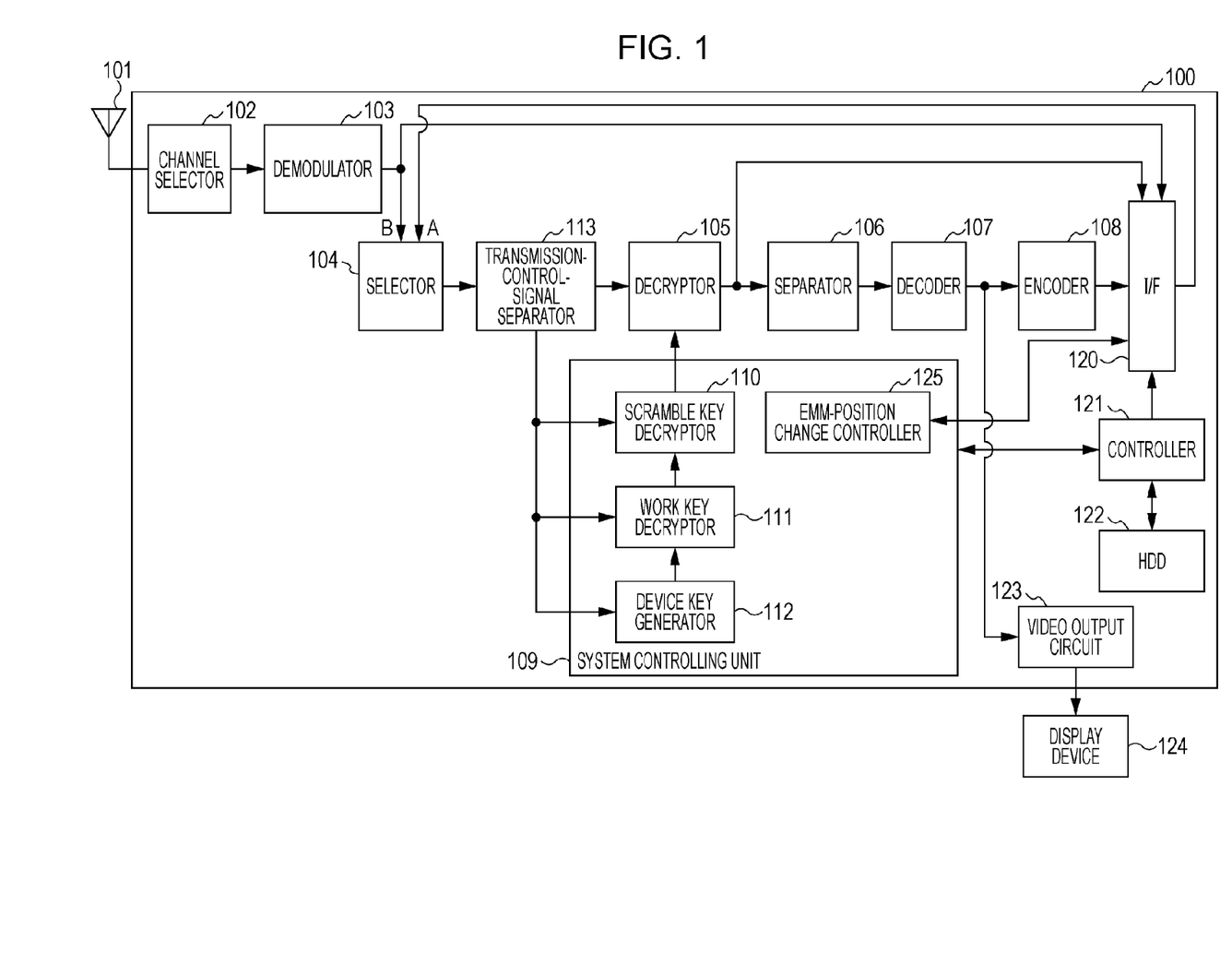
FIG. 1 is a block diagram showing an example of the configuration of a broadcast receiving apparatus according to a first exemplary embodiment of the present invention.

FIG. 1 is a block diagram showing an example of the configuration of a broadcast receiving apparatus 100 according to a first exemplary embodiment of the present invention.

Referring to FIG. 1, a channel selector 102 receives broadcast signals that are received through an antenna 101 to select a desired channel from the received broadcast signals. A demodulator 103 demodulates the signals that are modulated.

A selector 104 is a circuit that selectively outputs either of two inputs through an input terminal A and an input terminal B. A signal output from an interface (I/F) 120 is input through the input terminal A, and a signal output from the demodulator 103 is input through the input terminal B.

A transmission-control-signal separator 113 separates information (for example, an EMM stream) concerning a CAS system from a transport stream (TS). A decryptor 105 decrypts content that is scrambled (encrypted) by using a scramble key. A separator 106 extracts a necessary stream from the multiplexed streams.

A decoder 107 decodes Moving Picture Experts Group (MPEG) data to acquire video data. An encoder 108 encodes the video data into the MEPG format again.

A system controlling unit 109 controls each block in the broadcast receiving apparatus 100.

Figure 2:
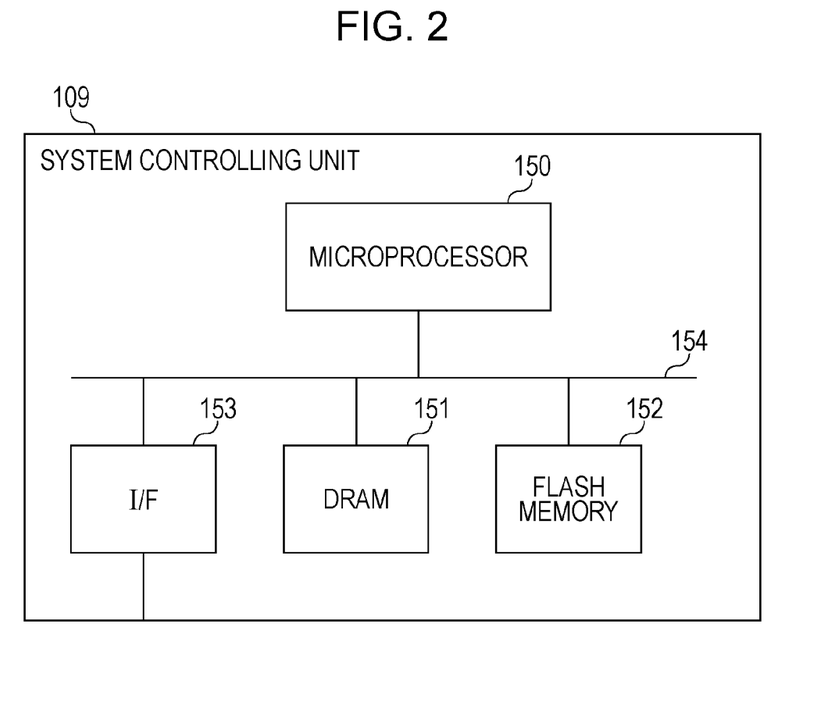
FIG. 2 is a block diagram showing an example of the hardware configuration of a system controlling unit in the broadcast receiving apparatus according to the first exemplary embodiment of the present invention.

FIG. 2 is a block diagram showing an example of the hardware configuration of the system controlling unit 109. Referring to FIG. 2, the system controlling unit 109 includes a microprocessor 150, a dynamic random access memory (DRAM) 151, a flash memory 152, an interface (I/F) 153, and a bus 154.

The microprocessor 150 sequentially processes instructions described as programs. The DRAM 151 is a volatile memory storing programs and data. The flash memory 152 is a non-volatile memory storing programs, initial data, device IDs, and so on.

For example, a program used for controlling a receiver, a program used for realizing the new RMP method, a program in which an algorithm for generating the device key used in the new RMP method is implemented, the device IDs, and the initial data are recorded in the flash memory 152 as firmware. A case in which the new RMP method is adopted as the content protection method is described in the present embodiment. However, for example, the new RMP method is also applicable to a method of downloading CAS software, such as Downloadable Conditional Access System (DCAS).

The interface 153 is used for communication with the other blocks in the broadcast receiving apparatus 100.

The blocks in the system controlling unit 109 are connected to each other via the bus 154. Data is exchanged between the blocks through the bus 154.

Referring back to FIG. 1, the system controlling unit 109 includes a scramble key decryptor 110, a work key decryptor 111, a device key generator 112, and an EMM-position change controller 125. The functions of these blocks in the system controlling unit 109 are realized by the microprocessor 150 that executes the programs.

The scramble key decryptor 110 decrypts the scramble key that is encrypted with the work key (a second encryption key). The work key decryptor 111 decrypts the work key that is encrypted with the device key (a first encryption key). The device key generator 112 acquires information about the device key corresponding to each device ID from the device-key updating EMM in accordance with the algorithm realizing the new RMP method to generate the device key. The device key generated in the above manner is specific to the device ID.

The EMM-position change controller 125 controls the positions of various EMMs in an EMM stream that is input.

The decryptor 105 described above uses the scramble key to decrypt a content stream. However, in order to acquire the scramble key, it is necessary for the scramble key decryptor 110 to decrypt the scramble key by using the work key. Accordingly, the decryptor 105 conceptually cooperates with the scramble key decryptor 110 to decrypt the content stream by using the work key.

The interface (I/F) 120 includes a bus and a control circuit. A controller 121 controls a recording device, such as an hard disk drive (HDD) or a digital versatile disk (DVD) drive, and an interface for the recording device. An HDD 122 is a recording device having information recorded thereon. The HDD 122 and the controller 121 perform writing transfer and reading transfer. If multiple writing transfer requests and multiple reading transfer requests are submitted, the HDD 122 and the controller 121 process the transfers in time division to concurrently achieve the multiple transfers.

A video output circuit 123 outputs a video signal to an output terminal. A display device 124 displays the video signal output from the video output circuit 123.

Figure 3:
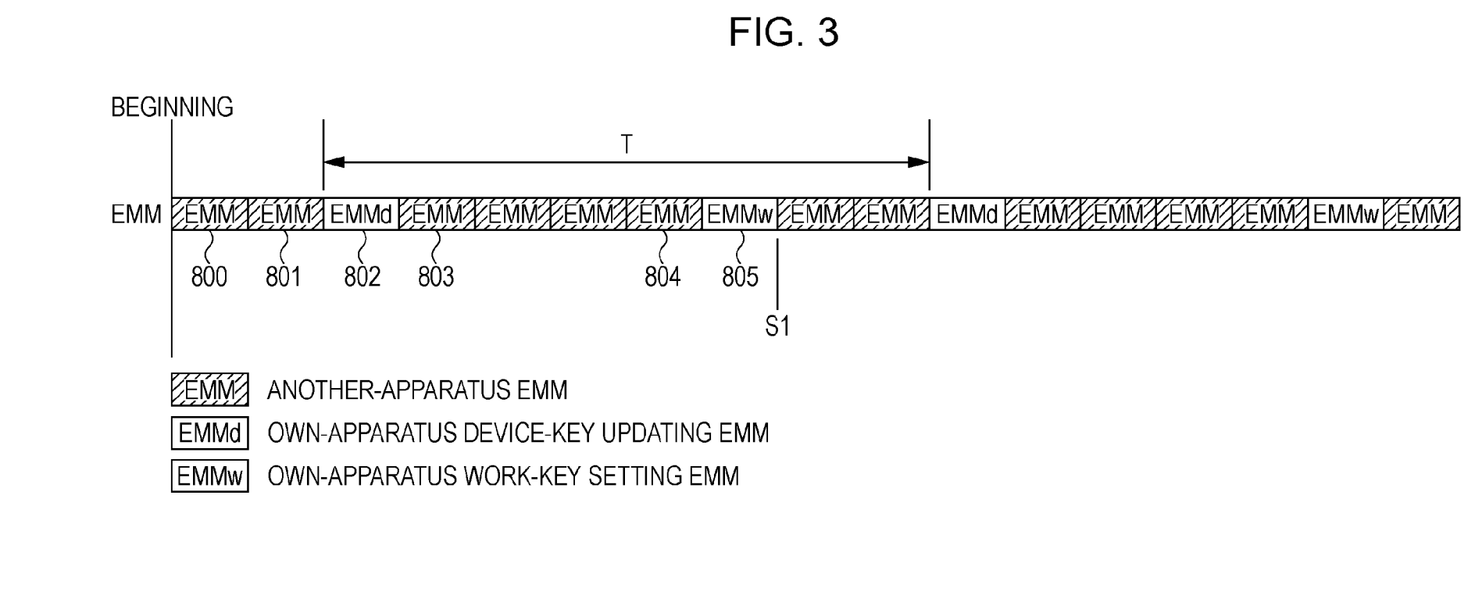
FIG. 3 schematically illustrates examples of EMMs included in an EMM stream.

FIG. 3 schematically illustrates examples of EMMs included in an EMM stream. Referring to FIG. 3, the beginning of the EMM stream is at the leftmost edge and the transmission time proceeds rightward.

The EMMs include the device-key updating EMMs and the work-key setting EMMs.

Various device-key updating EMMs and work-key setting EMMs corresponding to the respective apparatuses (strictly, the respective device IDs) are sequentially transmitted. This transmission is periodically repeated. Accordingly, the own-apparatus device-key updating EMM and the own-apparatus work-key setting EMM are transmitted once during one period.

It is necessary for the broadcast receiving apparatus 100 to acquire the scramble key with which the content stream is encrypted in order to play back the content. The broadcast receiving apparatus 100 performs the following processing in order to acquire the scramble key.

First, the broadcast receiving apparatus 100 acquires the device-key updating EMM to generate the device key with the device key generator 112. If the device key has already been acquired, the acquired device key may be used. Next, the broadcast receiving apparatus 100 acquires the work-key setting EMM to decrypt the work-key setting EMM by using the device key in order to acquire the work key. In other words, the work-key setting EMM (the second individual information) can be decrypted by using the device key. Then, the broadcast receiving apparatus 100 acquires the ECM and decrypts the ECM by using the work key to acquire the scramble key.

Conversely, the broadcast receiving apparatus 100 is not capable of playing back content before the broadcast receiving apparatus 100 generates the device key to acquire the work key and sets the work key in the CAS system (strictly, the scramble key decryptor 110).

The relationship between the playback of a content stream and the acquisition of the EMMs will now be described.

When the EMM stream shown in FIG. 3 is stored in a recording medium, the broadcast receiving apparatus 100 sequentially processes the EMMs from the beginning during the playback of the content stream. Referring to FIG. 3, an another-apparatus EMM 800 is first read out and the device ID included in the another-apparatus EMM 800 is checked. In this case, since the readout EMM 800 is for another apparatus, the EMM 800 is discarded. Then, an another-apparatus EMM 801 is read out. The readout EMM 801 is determined to be for another apparatus and is discarded.

Then, an EMM 802 is read out. The device ID included in the EMM 802 coincides with the device ID of the broadcast receiving apparatus 100. Accordingly, the broadcast receiving apparatus 100 determines that the EMM 802 is the device-key updating EMM and sets an update number for the device key generator 112. The update number indicates the version number of the device key. If an update number different from the one that has been used is set, the device key generator 112 generates a new device key. If the update number that is set coincides with the one that has been used, the device key generator 112 performs nothing. This results in acquisition of the device key corresponding to the content stream to be played back and allows the work key that will be acquired later to be decrypted by using the device key.

Then, the broadcast receiving apparatus 100 reads out an EMM 803. Since the EMM 803 is for another apparatus like the EMM 800, the broadcast receiving apparatus 100 discards the EMM 803. The EMMs subsequent to the EMM 803 until an EMM 804 are similarly discarded.

Then, the broadcast receiving apparatus 100 reads out an EMM 805. The device ID included in the EMM 805 coincides with the device ID of the broadcast receiving apparatus 100. Accordingly, the broadcast receiving apparatus 100 determines that the EMM 805 is the work-key setting EMM, extracts the encrypted work key from the work-key setting EMM, and acquires the work key by using the device key that has been acquired.

The acquisition of the work key allows the scramble key to be decrypted, and the content can be played back by using the scramble key. However, it is not possible to play back the content before a time S1. For this reason, the broadcast receiving apparatus 100 changes the order of the EMMs in the following manner in the recording of the EMM stream in the first exemplary embodiment.

Figure 4:
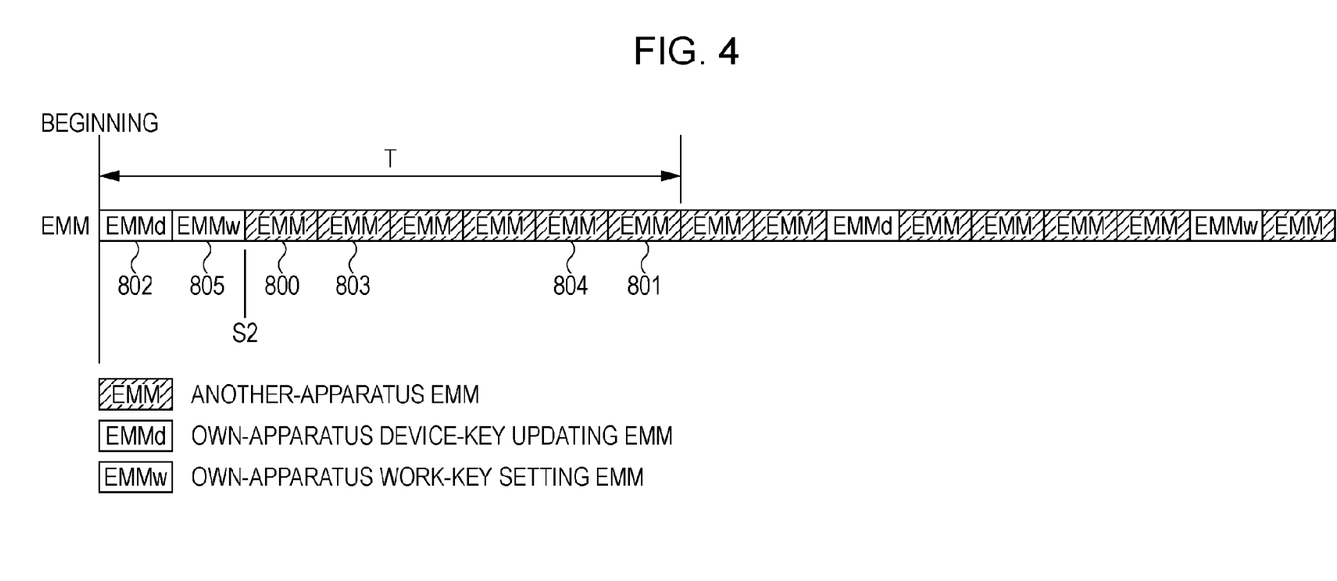
FIG. 4 schematically illustrates an example of the EMM stream when the broadcast receiving apparatus according to the first exemplary embodiment of the present invention changes the order of the EMMs.

FIG. 4 schematically illustrates an example of the EMM stream when the broadcast receiving apparatus 100 changes the order of the EMMs. The broadcast receiving apparatus 100 arranges the own-apparatus device-key updating EMM 802 at the beginning of the EMM stream and arranges the own-apparatus work-key setting EMM 805 next to the own-apparatus device-key updating EMM 802. This allows the broadcast receiving apparatus 100 to complete the acquisition of the work key at a time S2 in the playback of the content. Consequently, the time before the playback of the content is started is reduced.

Figure 5:
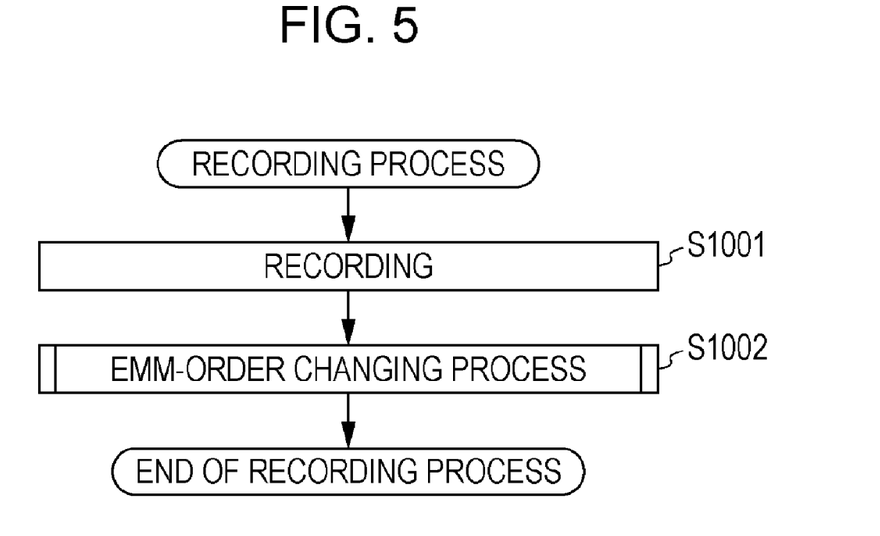
FIG. 5 is a flowchart showing an example of a recording process performed by the broadcast receiving apparatus according to the first exemplary embodiment of the present invention.

FIG. 5 is a flowchart showing an example of a recording process performed by the broadcast receiving apparatus 100. The steps in FIG. 5 and the following flowcharts are realized by the system controlling unit 109 that executes the programs to control the entire broadcast receiving apparatus 100, unless otherwise specified.

Referring to FIG. 5, in Step S1001, the system controlling unit 109 instructs the channel selector 102 to set the input terminal, instructs the channel selector 102 to set the path, and instructs the controller 121 to start recording. The broadcast receiving apparatus 100 demodulates a broadcast stream that is received through the antenna 101 and the channel selector 102 with the demodulator 103 and transmits the demodulated broadcast stream to the interface 120. The controller 121 records the broadcast stream output from the demodulator 103 in the HDD 122 through the interface 120. This process continues until a predetermined time and, then, is terminated.

When the recording of the received broadcast stream is completed, in Step S1002, the system controlling unit 109 changes the order of EMMs (an EMM-order changing process). The EMM-order changing process will be described in detail below with reference to FIG. 6.

The recording process is performed in the above manner.

Figure 6:
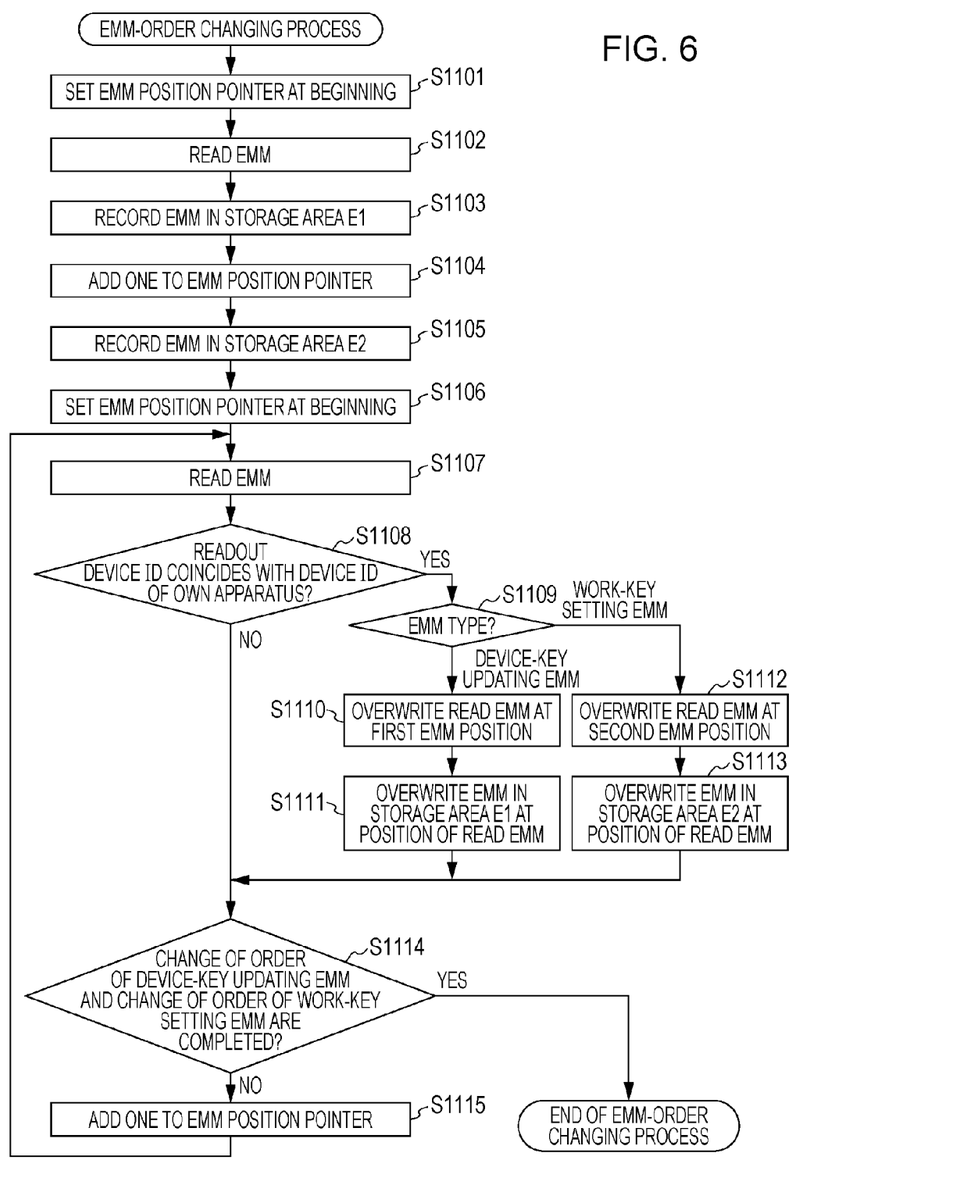
FIG. 6 is a flowchart showing an example of an EMM-order changing process in the recording process in FIG. 5.

FIG. 6 is a flowchart showing an example of the EMM-order changing process in Step S1002 in FIG. 5.

Referring to FIG. 6, in Step S1101, the system controlling unit 109 sets an address indicating the beginning of an EMM stream at a pointer (an EMM position pointer) indicating the position of an EMM to be referred to. The address used here is a logical address on the HDD 122.

In Step S1102, the system controlling unit 109 controls the controller 121, the interface 120, and the selector 104 to read out the EMM at the address indicated by the pointer from the HDD 122.

In Step S1103, the system controlling unit 109 records the EMM read out in Step S1102 in a storage area E1 defined on the DRAM 151.

In Step S1104, the system controlling unit 109 adds one to the value of the EMM position pointer. The value set as the value of the position pointer is not a logical address but a value corresponding to the order of the EMM that is recorded. The addition of one to the value of the EMM position pointer causes the next EMM in the EMM stream to be referred to.

In Step S1105, the system controlling unit 109 reads out the EMM at the address indicated by the EMM position pointer and records the readout EMM in a storage area E2 on the DRAM 151.

In Step S1106, the system controlling unit 109 sets the address indicating the beginning of the EMM stream at the EMM position pointer again.

In Step S1107, the system controlling unit 109 reads out the EMM at the address indicated by the EMM position pointer from the HDD 122 and records the readout EMM on the DRAM 151.

In Step S1108, the system controlling unit 109 reads out the device ID from the EMM recorded on the DRAM 151 and compares the readout device ID with the device ID given to the broadcast receiving apparatus 100. If the readout device ID coincides with the device ID given to the broadcast receiving apparatus 100 as the result of the comparison (YES in Step S1108), the process goes to Step S1109. If the readout device ID does not coincide with the device ID given to the broadcast receiving apparatus 100 (NO in Step S1108), the process goes to Step S1114.

In Step S1109, the system controlling unit 109 determines whether the EMM read out in Step S1107 is the device-key updating EMM or the work-key setting EMM. If the system controlling unit 109 determines that the readout EMM is the device-key updating EMM, the process goes to Step S1110. If the system controlling unit 109 determines that the readout EMM is the work-key setting EMM, the process goes to Step S1112.

In Step S1110, the system controlling unit 109 overwrites the own-apparatus device-key updating EMM read out in Step S1107 at the first EMM position in the EMM stream in the HDD 122.

In Step S1111, the system controlling unit 109 overwrites the EMM in the storage area E1 at the position where the device-key updating EMM read out in Step S1107 exists. As the result of Steps S1110 and S1111, the first EMM in the EMM stream is counterchanged with the own-apparatus device-key updating EMM read out in Step S1107.

If the system controlling unit 109 determines in Step S1109 that the readout EMM is the work-key setting EMM, then in Step S1112, the system controlling unit 109 overwrites the own-apparatus work-key setting EMM read out in Step S1107 at the second EMM position in the EMM stream in the HDD 122.

In Step S1113, the system controlling unit 109 overwrites the EMM in the storage area E2 at the position where the work-key setting EMM read out in Step S1107 exists. As the result of Steps S1112 and S1113, the second EMM in the EMM stream is counterchanged with the own-apparatus work-key setting EMM read out in Step S1107.

In Step S1114, the system controlling unit 109 determines whether the change of the order of the device-key updating EMM and the change of the order of the work-key setting EMM are completed. If the system controlling unit 109 determines that the change of the orders are completed (YES in Step S1114), the EMM-order changing process is terminated. If the system controlling unit 109 determines that the change of the orders are not completed (NO in Step S1114), the process goes to Step S1115. In Step S1115, the system controlling unit 109 adds one to the EMM position pointer and, then, the process goes aback to Step S1107.

Repetition of the loop process from Step S1107 results in the EMM stream shown in FIG. 4. Specifically, the broadcast receiving apparatus 100 searches for the own-apparatus device-key updating EMM and the own-apparatus work-key setting EMM and changes the positions of the device-key updating EMM and the work-key setting EMM that are found.

The own-apparatus device-key updating EMM may not be moved to the first EMM position in the EMM stream in Step S1110. Similarly, the own-apparatus work-key setting EMM may not be moved to the position next to the device-key updating EMM in the EMM stream in Step S1112. It is important in the first exemplary embodiment to overwrite the work-key setting EMM at a position that is later than the earliest device-key updating EMM (the EMM 802 in FIG. 3) in the EMM stream and that is closer to the beginning of the EMM stream as much as possible. For example, the overwriting of the work-key setting EMM 805 at the position of the EMM 803 in the example in FIG. 3 moves the time S1 immediately after the EMM 803, so that the time before the playback of the content is started is reduced.

Steps S1111 and S1113 may not be performed. In other words, only the overwriting of the own-apparatus EMMs may be performed without changing the orders of the EMMs. In this case, although the EMMs that existed at the overwritten positions are lost, the loss of the EMMs does not adversely affect the playback of content in the broadcast receiving apparatus 100.

An operation of playing back content that is recorded in the broadcast receiving apparatus 100 will now be described.

The system controlling unit 109 controls the controller 121 to read out a broadcast stream recorded on the HDD 122. The interface 120 supplies the broadcast stream to the selector 104. The system controlling unit 109 causes the selector 104 to select the input through the input terminal B. As a result, the broadcast stream is supplied to the transmission-control-signal separator 113, the decryptor 105, the scramble key decryptor 110, the work key decryptor 111, and the device key generator 112.

On the assumption that the order of the EMMs is changed to the order shown in FIG. 4, the device key generator 112 generates the device key by using the first EMM 802 and the work key decryptor 111 acquires the work key by using the second EMM 805 and the generated device key. The work key decryptor 111 sets the decrypted work key in the scramble key decryptor 110. The decryptor 105 is capable of decrypting the content stream by using the scramble key decrypted by the scramble key decryptor 110, thereby allowing the recorded content to be played back.

Specifically, the separator 106 separates a video stream from the decrypted TS, the decoder 107 decodes the video stream, and the video output circuit 123 supplies the video stream to the display device 124. This allows the broadcast stream recorded on the HDD 122 to be played back and displayed.

Although it is assumed that the new RMP method is used in the first exemplary embodiment, a B-CAS system may be used. When a B-CAS system is used, it is possible to achieve similar effects by using a card ID instead of the device ID.

The positions of the EMMs may be adjusted over the entire EMM stream, instead of moving the EMMs in the first period in the EMM stream as in the example in FIG. 4. For example, the broadcast receiving apparatus 100 may be configured so that the device-key updating EMM is arranged at the beginning of each chapter and the work-key setting EMM is arranged next to the device-key updating EMM.

The EMMs for the own apparatus are arranged at the optimal positions in the first exemplary embodiment. However, if a broadcast stream that is recorded is to be played back by other broadcast receiving apparatuses, the positions of the EMMs corresponding to the device IDs of the other broadcast receiving apparatuses may be moved. In this case, the broadcast receiving apparatus 100 sequentially arranges the EMMs for multiple desired broadcast receiving apparatuses from the beginning of the EMM stream.

In order to acquire the work key in a short time, an encryption key table holding the work key may be created. In this case, there is a risk of leakage of the work key. However, since the broadcast receiving apparatus 100 according to the first exemplary embodiment operates only the order of the EMMs in the EMM stream, the risk of leakage of the encryption key is smaller than that in the case where the encryption key table is created.

As described above, according to the first exemplary embodiment, the broadcast receiving apparatus 100 moves the EMMs for the own apparatus to earlier positions in the EMM stream and records the EMMs at the positions.

This reduces the time before the broadcast receiving apparatus 100 starts to play back content that is recorded.

Figure 7:
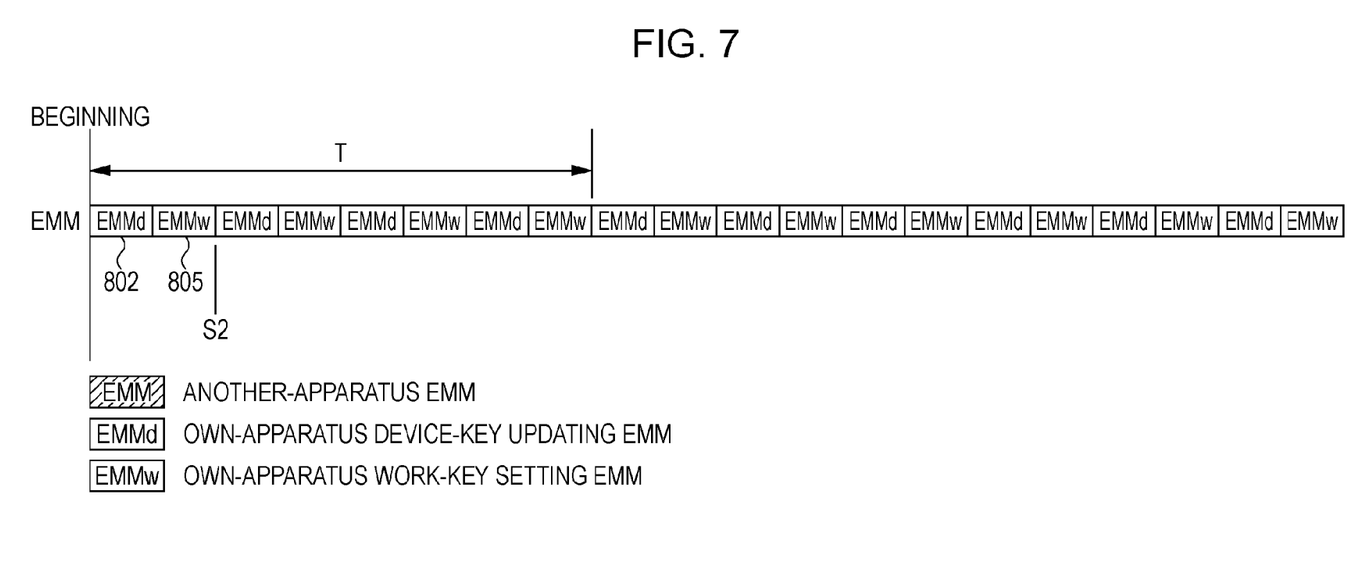
FIG. 7 schematically illustrates an example of an EMM stream when a broadcast receiving apparatus according to a second exemplary embodiment of the present invention changes the order of the EMMs.

According to a second exemplary embodiment of the present invention, the broadcast receiving apparatus overwrites the EMMs over the entire EMM stream, as shown in an example in FIG. 7.

Figure 8:
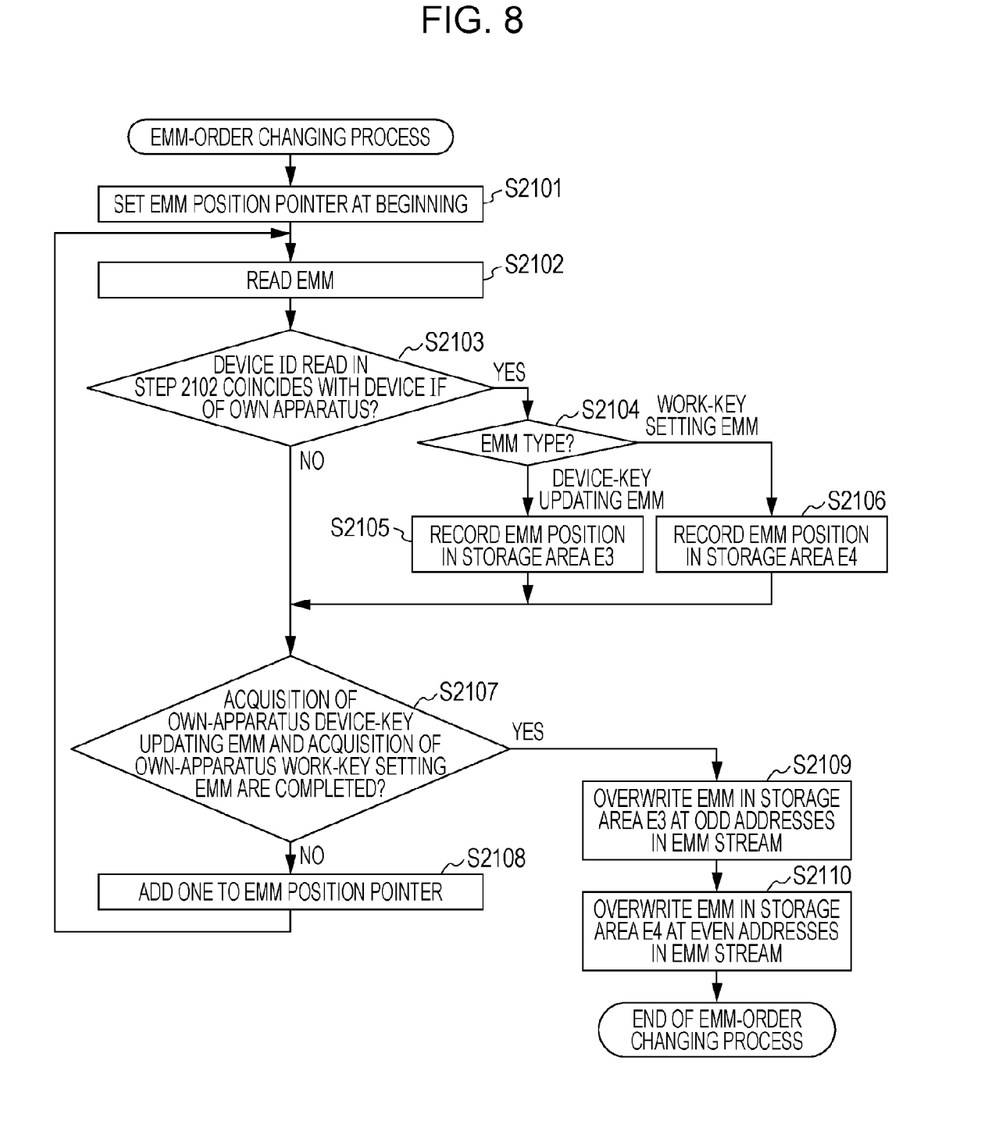
FIG. 8 is a flowchart showing an example of an EMM-order changing process according to the second exemplary embodiment of the present invention.

Since the configuration of the broadcast receiving apparatus 100 in the second exemplary embodiment is the same as in the first exemplary embodiment, a description of the configuration in the second exemplary embodiment is omitted herein (refer to FIGS. 1 and 2). The processing in Step S1002 in FIG. 5 is performed in a manner shown in FIG. 8, instead of the manner shown in FIG. 6. FIG. 8 is a flowchart showing an example of an EMM-order changing process according to the second exemplary embodiment.

Referring to FIG. 8, in Step S2101, the system controlling unit 109 sets the address indicating the beginning of the EMM stream at the EMM position pointer.

In Step S2102, the system controlling unit 109 reads out the EMM at the position indicated by the EMM position pointer from the EMM stream in the HDD 122.

In Step S2103, the system controlling unit 109 reads out the device ID from the EMM read out in Step S2102 and compares the readout device ID with the device ID given to the own apparatus. If the readout device ID coincides with the device ID given to the own apparatus as the result of the comparison (YES in Step S2103), the process goes to Step S2104. If the readout device ID does not coincide with the device ID given to the own apparatus (NO in Step S2103), the process goes to Step S2107.

In Step S2104, the system controlling unit 109 determines whether the EMM read out in Step S2102 is the device-key updating EMM or the work-key setting EMM. If the system controlling unit 109 determines that the readout EMM is the device-key updating EMM, the process goes to Step S2105. If the system controlling unit 109 determines that the readout EMM is the work-key setting EMM, the process goes to Step S2106.

In Step S2105, the system controlling unit 109 records the EMM read out in Step S2102 in a storage area E3 on the DRAM 151.

In Step S2106, the system controlling unit 109 records the EMM read out in Step S2102 in a storage area E4 on the DRAM 151.

In Step S2107, the system controlling unit 109 determines whether the acquisition of the own-apparatus device-key updating EMM from the EMM stream and the acquisition of the own-apparatus work-key setting EMM from the EMM stream are completed. If the system controlling unit 109 determines that the acquisitions are completed (YES in Step S2107), the process goes to Step S2109. If the system controlling unit 109 determines that the acquisitions are not completed (NO in Step S2107), the process goes to Step S2108.

In Step S2108, the system controlling unit 109 adds one to the value of the EMM position pointer. Then, the process goes back to Step S2102 to repeat the same steps.

In Step S2109, the system controlling unit 109 overwrites the EMM in the storage area E3 at the odd addresses in the entire EMM stream. In Step S2110, the system controlling unit 109 overwrites the EMM in the storage area E4 at the even addresses in the entire EMM stream. In other words, in Steps S2109 and S2110, the system controlling unit 109 alternately overwrites the own-apparatus device-key updating EMM and the own-apparatus work-key setting EMM over the entire EMM stream.

The above process causes all the EMMs in the EMM stream recorded by the broadcast receiving apparatus 100 to be replaced with the EMMs for the own apparatus, as shown in the example in FIG. 7. The EMM stream in FIG. 7 does not include the EMMs for other apparatuses.

Accordingly, even if the playback of content is started in an intermediate point in the stream, it is possible for the broadcast receiving apparatus 100 to acquire the EMMs for the own apparatus in a short time.

When a broadcast stream that is recorded is to be played back by another broadcast receiving apparatus, it is necessary to record the device-key updating EMM and the work-key setting EMM for the other broadcast receiving apparatus. In this case, the broadcast receiving apparatus 100 repetitively records four kinds of EMMs: the own-apparatus device-key updating EMM, the own-apparatus work-key setting EMM, the device-key updating EMM for the other broadcast receiving apparatus, and the work-key setting EMM for the other broadcast receiving apparatus in the EMM stream. Accordingly, it is possible for not only the own apparatus but also the other apparatus that is set in advance to acquire the necessary EMMs in a short time.

As described above, according to the second exemplary embodiment, the broadcast receiving apparatus 100 overwrites the EMMs for the own apparatus over the entire EMM stream.

Consequently, even if the playback of content is started in an intermediate point in the stream, it is possible for the broadcast receiving apparatus 100 to acquire the EMMs for the own apparatus in a short time and the time before the playback is started is reduced.

According to a third exemplary embodiment of the present invention, the broadcast receiving apparatus stores information indicating the positions of the EMMs for the own apparatus at the header of a broadcast stream, instead of moving the positions of the EMMs in the EMM stream.

Figure 9:
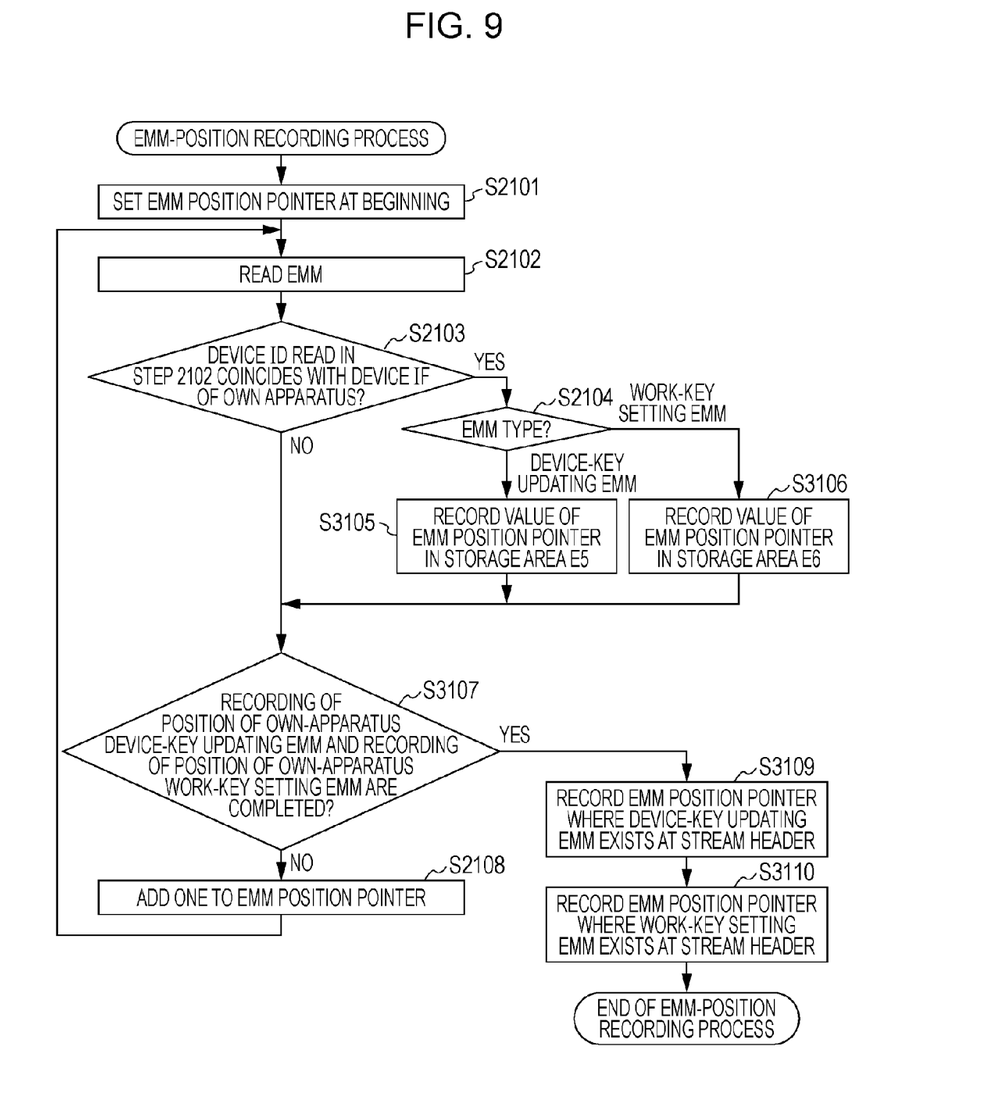
FIG. 9 is a flowchart showing an example of an EMM-position recording process according to a third exemplary embodiment.

Since the configuration of the broadcast receiving apparatus 100 in the third exemplary embodiment is the same as in the first exemplary embodiment, a description of the configuration in the third exemplary embodiment is omitted herein (refer to FIGS. 1 and 2). The EMM-order changing process shown in FIG. 6, performed in Step S1002 in FIG. 5, is replaced with an EMM-position recording process shown in FIG. 9 in the third exemplary embodiment. FIG. 9 is a flowchart showing an example of the EMM-position recording process according to the third exemplary embodiment. The same reference numerals are used in FIG. 9 to identify the same steps shown in FIG. 8. A description of such steps is omitted herein.

Referring to FIG. 9, in Step S3105, the system controlling unit 109 records the value of the EMM position pointer indicating the position of the own-apparatus device-key updating EMM (that is, the current EMM position pointer) in a storage area E5 on the DRAM 151.

In Step S3106, the system controlling unit 109 records the value of the EMM position pointer indicating the position of the own-apparatus work-key setting EMM (that is, the current EMM position pointer) in a storage area E6 on the DRAM 151.

In Step S3107, the system controlling unit 109 determines whether the recordings of the EMM position pointers in Steps S3105 and S3106 are completed. If the system controlling unit 109 determines that the recordings of the EMM position pointers in Steps S3105 and S3106 are completed (YES in Step S3107), the process goes to Step S3109. If the system controlling unit 109 determines that the recordings of the EMM position pointers in Steps S3105 and S3106 are not completed (NO in Step S3107), the process goes to Step S2108.

In Step S3109, the system controlling unit 109 records the EMM position pointer recorded in the storage area E5 at the header of the broadcast stream recorded in the HDD 122.

In Step S3110, the system controlling unit 109 records the EMM position pointer recorded in the storage area E6 at the header of the broadcast stream recorded in the HDD 122.

The above process causes the positions of the EMMs for the own apparatus to be recorded at the header of the broadcast stream recorded by the broadcast receiving apparatus 100. Accordingly, upon start of the playback of content, it is possible for the broadcast receiving apparatus 100 to acquire the positions of the EMMs for the own apparatus from the header of the broadcast stream to extract the EMMs for the own apparatus on the basis of the acquired positions.

This reduces the time before the broadcast receiving apparatus 100 starts to play back content that is recorded.

The present invention can be embodied by supplying a recording medium including the program code of software realizing the functions according to the above embodiments to a system or an apparatus, the computer (or the central processing unit (CPU) or the micro processing unit (MPU)) in which system or apparatus reads out and executes the program code recorded in the recording medium. In this case, the program code itself read out from the recording medium realizes the functions of the embodiments described above. The present invention is applicable to the recording medium having the program code recorded thereon. The recording medium supplying the program code may be any recording medium, such as a flexible disk, a hard disk, an optical disk, a magneto-optical disk, a compact disc-read only memory (CD-ROM), a compact disc recordable (CD-R), a magnetic tape, a non-volatile memory card, or a read only memory (ROM).

The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the recording medium has been written in a memory that is provided in a function expansion board included in the computer or in a function expansion unit connected to the computer, the CPU or the like in the expansion board or the expansion unit may execute all or part of the actual processing based on instructions in the program code to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-207403 filed Aug. 11, 2008, which is hereby incorporated by reference herein in its entirety.

What is claimed is:

1. A broadcast receiving apparatus that includes identification information used for identifying the broadcast receiving apparatus and that receives broadcast signals, the broadcast receiving apparatus comprising:
a generating unit configured to generate a first encryption key specific to the broadcast receiving apparatus including the identification information;
a recording unit configured to record a broadcast stream that is included in a certain channel of the broadcast signals and that includes an individual information stream and a content stream requiring a second encryption key for decryption, the individual information stream periodically including first individual information items that are necessary for the generation of the first encryption key by the generating unit and second individual information items that each include the second encryption key and that can be decrypted with the first encryption key;
a searching unit configured to search for the earliest first individual information item in the individual information stream and the earliest second individual information item in the individual information stream from the individual information stream included in the broadcast stream recorded in the recording unit; and
an overwriting unit configured to overwrite the second individual information item found by the searching unit at a position that is earlier than the position where the second individual information item is found and that is later than the position where the first individual information item is found in the individual information stream.

2. The broadcast receiving apparatus according to claim 1, wherein the overwriting unit overwrites the first individual information item found by the searching unit at a position that is earlier than the position where the first individual information item is found in the individual information stream.

3. The broadcast receiving apparatus according to claim 2, wherein the position at which the overwriting unit overwrites the first individual information item is a first position in the individual information stream, and the position at which the overwriting unit overwrites the second individual information item is a second position in the individual information stream.

4. The broadcast receiving apparatus according to claim 2, wherein the overwriting unit overwrites information on the position where the first individual information item found by the searching unit is overwritten at the position where the first individual information item is found.

5. The broadcast receiving apparatus according to claim 1, wherein the overwriting unit overwrites information on the position where the second individual information item found by the searching unit is overwritten at the position where the second individual information item is found.

6. The broadcast receiving apparatus according to claim 1,
wherein the first individual information items and the second individual information items each include the identification information, and
wherein the searching unit compares the identification information included in the first individual information items and the second individual information items with the identification information of the broadcast receiving apparatus to search for the earliest first individual information item in the individual information stream and the earliest second individual information item in the individual information stream.

7. A method of controlling a broadcast receiving apparatus that includes identification information used for identifying the broadcast receiving apparatus and that receives broadcast signals, the method comprising:
generating a first encryption key specific to the broadcast receiving apparatus including the identification information;
recording a broadcast stream that is included in a certain channel of the broadcast signals and that includes an individual information stream and a content stream requiring a second encryption key for decryption, the individual information stream periodically including first individual information items that are necessary for the generation of the first encryption key in the generating step and second individual information items that each include the second encryption key and that can be decrypted with the first encryption key;
searching for the earliest first individual information item in the individual information stream and the earliest second individual information item in the individual information stream from the individual information stream included in the broadcast stream recorded in the recording step; and
overwriting the second individual information item found in the searching step at a position that is earlier than the position where the second individual information item is found and that is later than the position where the first individual information item is found in the individual information stream.

8. The method according to claim 7,
wherein the overwriting step overwrites the first individual information item found by searching at a position that is earlier than the position where the first individual information item is found in the individual information stream.

9. The method according to claim 8,
wherein the position at which the overwriting step overwrites the first individual information item is a first position in the individual information stream, and the position at which the overwriting step overwrites the second individual information item is a second position in the individual information stream.

10. The method according to claim 8,
wherein the overwriting step overwrites information on the position where the first individual information item found by searching is overwritten at the position where the first individual information item is found.

11. The method according to claim 7,
wherein the overwriting step overwrites information on the position where the second individual information item found by searching is overwritten at the position where the second individual information item is found.

12. The method according to claim 7,
wherein the first individual information items and the second individual information items each include the identification information, and
wherein the searching compares the identification information included in the first individual information items and the second individual information items with the identification information of the broadcast receiving apparatus to search for the earliest first individual information item in the individual information stream and the earliest second individual information item in the individual information stream.

* * * * *